Patented Mar. 23, 1943

2,314,837

UNITED STATES PATENT OFFICE 2,314,837

PROCESS FOR PRESERVING FOOD JUICES

Avedis Artinian, New York, and Cloyd M. Chapman, Glen Cove, N. Y.

No Drawing. Application June 3, 1940,
Serial No. 338,580

3 Claims. (Cl. 99—155)

Our invention relates to the preservation of juices, and more particularly to the preservation of food juices of fruits and vegetables which are susceptible to change of flavor and aroma when subjected to the processes ordinarily employed in preserving them.

The object of our invention is to provide a method which is inexpensive in operation, is carried out by simple procedures and which has no effect upon the flavor or aroma of the juices, to the preservation of which it is adapted.

Our process is found to be particularly applicable to the preservation of those juices which are most highly sensitive to the effect of preservative processes upon their flavor and aroma, and at the same time are the juices that are now in greatest favor of the public, namely, the juices of the citrus fruits, such as the orange, grapefruit, lemon and other juices.

We have found that the essential elements of a process for successfully treating juices of these and other fruits and vegetables which has a minimum effect upon the natural taste of the fresh fruit juice, even after the processed juice has been kept for extended periods of time, are quick sterilization by heating them to a temperature approaching, but not reaching, the boiling point, while surrounded by an atmosphere supersaturated with moisture and entirely free of contaminating organisms.

We find, and it is generally well known, that if the juices are subjected to heat for considerable periods of time, at temperatures commonly employed in preserving juices by what is known as pasteurization, at temperatures usually ranging from 130° or 140° F. or a little higher, for periods of from 5 to 30 minutes, there is a very noticeable change takes place in the flavor and aroma of the juice, so much so that the commercial preserved juices now on the market, which are preserved in this manner find but limited favor with the public. That is, although large quantities of such juices are now marketed, the quantity would be vastly greater if the flavor and aroma could be retained in the preserved juice.

Many variations of the pasteurization method have been used and many other methods have been devised for sterilization and for preventing contamination of the juice by bacteria, spores and other deleterious, contaminating or putrifying organisms during the processing and during the subsequent delivery of the processed juice to and into the containers in which it is to be held until used, and for preserving the juice while in the containers. These methods have included the use of partial or high vacuum, of inert, or active gases, such as nitrogen, carbon dioxide, sulphurous oxide and others.

We find that, notwithstanding the claims made for each of these many processes, they have thus far failed to produce a product which consumers generally are willing to use as an acceptable substitute for freshly extracted juice and on a par therewith.

We find that if juice of one of the citrus fruits, as, for example, the orange, is heated rapidly to a temperature approaching, but not equaling or exceeding, its boiling point, and if the heating is carried on in a chamber which is filled with an atmosphere supersaturated with water vapor or steam vapor, which is also at a temperature approaching, but not reaching, the boiling point of the fruit juice and under atmospheric pressure, that is, without any reduction or increase in the pressure within the chamber, and if the juice is kept thereafter sealed in a sterile container, out of contact with air, that juice so processed retains its natural flavor and aroma to such a degree that it is difficult, and for most persons impossible, to distinguish from fresh, untreated juice, even after many months of storage.

As the temperature of the juice is raised rapidly to a point approaching, but not reaching or exceeding, its boiling point, the bacteria, spores, germs and other heat-sensitive organisms therein are killed. As the temperature of the atmosphere within the chamber is also heated to approximately the same temperature, any bacteria, spores or other heat-sensitive organisms floating therein are also killed.

The heating of the atmosphere within the chamber may be accomplished by the injection thereinto of steam or by heating by any suitable means, such for example, as electric resistance heaters, and the air humidified by injection of water vapor or spray. The atmosphere within the chamber may advantageously be circulated, changed or renewed by continuously or intermittently withdrawing a portion and admitting fresh air.

The vapor laden atmosphere resembles a fog, consisting of minute particles of water in suspension which attach themselves to any micro-organisms, such as bacteria, spores, etc. which may be present in the atmosphere, and carry them from the chamber.

It is well known that water, which constitutes well over ninety percent of citrus fruit juices, by weight, absorbs gases, notably oxygen, to a much greater degree when cold than when warm. By heating water, in which oxygen and other gases are dissolved, to a higher temperature a part of the dissolved oxygen and other gases is liberated, or thrown out of solution. If the heating is continued to the boiling point substantially all dissolved free oxygen and other gases will be expelled. Thus, by heating the fruit juices to a temperature approaching their boiling point practically all dissolved free gases are expelled from the juice without having reached the critical temperature at which rapid changes occur which alter the taste and aroma of the juice.

The oxygen content of water in contact with air bears a well known definite relation to the total pressure and temperature of the water, according to Henry's and Dalton's laws, namely, that the solubility of a gas in a liquid is proportional to its partial pressure and inversely proportional to the temperature.

For example, if we consider the case of ordinary potable water, at a temperature of 70° F. and at atmospheric pressure, which has been exposed to the air, it will contain approximately six cubic centimeters of oxygen per liter when saturated; whereas if the temperature of this water is raised to 212° F. at sea level, all of the dissolved oxygen will be expelled. It is also well known that the rate at which water dissolves oxygen is slower when it is in contact with moist air than it is when in contact with dry air.

By maintaining the temperature of the moisture laden atmosphere within the chamber in which the juice is being heated at a point not substantially different from that of the juice being treated there is little or no interchange of moisture takes place between the juice and the atmosphere. That is to say, if the temperature of the surrounding atmosphere laden with water vapor or steam vapor does not greatly differ, either higher or lower, from the temperature of the juice, there will be little condensation of moisture from the atmosphere to the juice and little evaporation of moisture from the juice to the surrounding atmosphere.

Our process may be carried out by means of any of several types of apparatus commonly used in the process industries for the indirect interchange of heat between two fluids, in which one of the fluids, in this case the juice, is exposed to the atmosphere surrounding the apparatus, and the other fluid, in this case the heating fluid, is confined within a closed vessel, such as a pipe, jacket, etc. Any such apparatus, of suitable design, operated within a chamber in which the atmosphere surrounding the apparatus is maintained in a supersaturated condition as described hereinabove, and maintained at a temperature approximately that of the exposed juice, will serve to carry out our process.

Our method possesses the distinct advantage that it is not necessary to strain the pulp from the juice when dealing with a citrus fruit, such as the orange. It is desirable to remove the "rag," which consists of the pith, the central stem and the membrane surrounding the segments, and also the seeds, but the small elongated cells, which contain the juice, need not be removed. Thus our processed juice has every appearance of juice extracted from fresh fruit in the home.

We find it desirable that the extraction of the juice from the fruit, previous to subjecting it to our process, be carried out in a manner that will keep it practically free from the oils present in the skin of the fruit, as the presence of even a minute quantity of this oil alters the taste and aroma to a degree that is noticeable and objectionable to those accustomed to juices freshly extracted from the whole fruit by methods commonly used in the home, or in the best restaurants and other establishments which dispense such juices. The method of extracting the juice does not, however, form any part of our invention, and is mentioned only for the better practice of the invention.

Having described our invention fully, we now state what we believe to be new and novel and for which we pray that Letters Patent be granted.

We claim:

1. The process of preserving food juices which comprises rapidly heating the juice at atmospheric pressure to a temperature approaching but not reaching its boiling point in an atmosphere supersaturated with water vapor at a temperature approximating the temperature of the food juice with which it is in contact, said heating of the juice being effected by indirect means wherein no steam comes into contact with the food juices.

2. The process of preserving food juices which comprises rapidly heating the juice at atmospheric pressure and without contact with steam, to a temperature approaching but not reaching its boiling point while surrounded by and in contact with an atmosphere supersaturated with water vapor at a temperature approximating the temperature of the juice.

3. The process of preserving food juices which consists in rapidly heating the juice at atmospheric pressure by contact with a heated surface to a temperature approaching but not reaching its boiling point, while surrounded by an atmosphere saturated with water vapor at a temperature approximating the temperature of the food juice with which it is in contact.

AVEDIS ARTINIAN.
CLOYD M. CHAPMAN.